United States Patent [19]
Sensen et al.

[11] Patent Number: 5,912,022
[45] Date of Patent: Jun. 15, 1999

[54] DEVICE TO LAY FLAT A FILM TUBE

[75] Inventors: Klemens Sensen, Lengerich; Jürgen Linkies, Lienen, both of Germany

[73] Assignee: Windmöller & Hölscher, Lengerich/Westf., Germany

[21] Appl. No.: 08/810,926

[22] Filed: Mar. 5, 1997

[30] Foreign Application Priority Data

Mar. 12, 1996 [DE] Germany ............................ 196 09 638

[51] Int. Cl.⁶ ................................................ B29C 53/20
[52] U.S. Cl. ..................... 425/72.1; 425/326.1; 425/392; 425/183; 425/387.1
[58] Field of Search ................................ 425/72.1, 326.1, 425/392, 183, 387.1; 264/209.3

[56] References Cited

U.S. PATENT DOCUMENTS

| | | | |
|---|---|---|---|
| 2,697,852 | 12/1954 | Bailey | 264/566 |
| 3,335,208 | 8/1967 | Harris | 264/566 |
| 3,539,666 | 11/1970 | Schirmer | 425/72.1 |
| 4,615,666 | 10/1986 | Steinburg | 425/72.1 |
| 5,437,544 | 8/1995 | Achelpohl . | |

FOREIGN PATENT DOCUMENTS

| | | |
|---|---|---|
| 2156079C2 | 7/1983 | Germany . |
| 2035584C2 | 7/1986 | Germany . |
| 3506772C2 | 9/1986 | Germany . |
| 47-9754 | 3/1972 | Japan ..................................... 425/72.1 |
| 548850 | 5/1974 | Switzerland ........................... 425/72.1 |
| 939064 | 10/1963 | United Kingdom . |

*Primary Examiner*—Jay H. Woo
*Assistant Examiner*—Robert Hopkins
*Attorney, Agent, or Firm*—Evenson, McKeown, Edwards & Lenahan, PLLC

[57] ABSTRACT

A device to lay flat a film tube drawn from an inflated film bubble generated in a film blowing system includes lay-flat platens which delimit the film bubble and which are placed against the bubble in the form of a wedge. The platens are positioned in front of the squeeze rollers of a film take-up and winding device and have slip elements arranged transversely relative to the take-up device. A driven reversing frame can be provided to hold the lay-flat platens, support the squeeze rollers, and support guide rollers and turning bars about its rotating axis in a pivoting fashion. In order to decrease the friction between the film tube which is to be laid flat and the lay-flat platens, particularly for a reversing take-up, the slip elements have hollow sections including air blast nozzles or air blast slots facing the film tube to be laid flat. The hollow sections can be connected by lines to an air blast source.

9 Claims, 2 Drawing Sheets

DEVICE TO LAY FLAT A FILM TUBE

BACKGROUND OF THE INVENTION

1. Field of the Invention

This invention relates to a device to lay flat a film tube which is drawn from an inflated film bubble generated in a film blowing system. The device includes flat platens which delimit the film bubble and which are placed, in the form of a wedge, against the film bubble. The platens are positioned in front of the squeeze rollers of a film take-up and winding device and are provided with slip elements arranged transverse relative to the take-up device. A driven reversing frame, which holds the lay-flat platens, supports the squeeze rollers, and supports guide rollers and turning bars about its rotating axis in a pivoting fashion.

2. Description of Related Art

Lay-flat platens which are reversible up to 360° and which have pivotable guide rollers and turning bars of this type are known, for example, from DE-OS 2,035,584, DE-PS 2,156,079, DE-PS 3,506,772 and DE-OS 4,303,952. The slip elements, which enable an improved sliding of a film tube over the lay-flat platens, can consist of strips having low friction surfaces or coatings, of rolls, or of small rollers.

In spite of the low-friction guiding of a film tube to be laid flat on lay-flat platens, problems may arise when laying a film tube flat due to the fact that the tube has a surface which is not yet fully cooled and, as a result, is sticky. Particular difficulties arise during the laying flat process when a reversing take-up is provided. A reversing take-up occurs when the squeeze rollers downstream of the lay-flat platens are driven so as to reverse by angles of up to 360°. Difficulties also arise when the rollers are driven so as to turn continuously. For a reversing take-up, when laying flat very sticky film tubes, an undesired edge fold formation tends to occur in the top region of the lay-flat platens. This edge fold results from a twisting of the film tube due to the reversing turning movement. For a nonadhering film with good sliding properties, this twisting can be compensated for by a transversely oriented sliding movement of the film with respect to the lay-flat platens. However, for a highly adhesive and sticky film, this type of compensation is no longer possible since the film adheres too strongly to the slip elements, rolls, or small rollers. Undesirable edge fold formation results prior to the squeeze rollers.

SUMMARY OF THE INVENTION

Consequently, the purpose of the invention is to create a device of the aforementioned type in which the friction between the film tube to be laid flat and the lay-flat platens is significantly reduced. This friction is to such a degree that even when laying flat a highly adhesive film having a tendency to stick, with the use of a reversing take-up, no edge fold formation develops prior to the entry of the laid-flat film tube into the squeeze rollers.

In accordance with the invention, this problem is solved by forming the slip elements so that they have hollow sections with air blast nozzles or air blast slots which face the film tube. The sections can be connected by lines to an air blast sources. For a film tube to be flattened which has a good sliding surface, a lay-flat device in accordance with the invention permits operation without an air blast being blown from the air blast nozzles or air blast slots, since the hollow sections themselves possess sufficiently good sliding properties.

If a sticky or highly adhesive film is to be laid flat, then an air blast is blown out from the air blast nozzles or air blast slots and the film tube to be laid flat is guided while floating to the squeeze rollers. The friction is highly reduced in this way. A compensation in the transverse direction of the film tube, as it is increasingly laid flat, is also provided when the film tube is being taken up in a reversing manner through the squeeze rollers.

With known lay-flat platens, slip elements are arranged between transversely positioned rows of rollers or rolls and conventionally consist of wood battens. In place of these slip elements, hollow sections can be arranged between the rows of rolls or rollers in accordance with the invention. The hollow sections take over the function of known slip elements or wood battens in cases in which the work can be done without air blasts.

The hollow sections advantageously include tubes with rows of air blast nozzles. The hollow sections also can include boxes having one or more rows of air blast nozzles. The hollow sections also can include sections provided with longitudinally oriented slots.

A particularly preferred embodiment provides for each lay-flat platen to consist of a mounting held in the frame. Rolls, small rollers or strips are arranged in parallel rows and at intervals relative to each others. The hollow sections are provided with air blast nozzles or air blast slots and are held on an auxiliary mounting connected to the mounting such that they reach between the rolls, small rollers, or strips. The auxiliary mounting is connected to the mounting held in the frame by adjustable holding devices. The auxiliary mounting is pivotable relative to the mounting and can be driven up to and removed from it. This configuration permits the auxiliary mounting, which carries the hollow sections provided with air blast nozzles or air blast gaps, to be adjustable relative to the main mounting. Hollow sections, to which an air blast is being applied, can be brought into their desired working positions by driving the auxiliary mounting in or out. By slightly inclining the auxiliary mounting, the depth of immersion of the hollow sections can be changed such that, starting from the top, the sections can be brought into stronger or weaker engagement.

The main mounting advantageously is supported so as to be pivotable about the upper shafts of the frame. Additional adjusting devices can be provided in order to adjust the angular pitch of the lay-flat platens.

An additional configuration of the invention provides for the rolls or small rollers to be provided with drives and/or braking devices. The rolls or small rollers of the individual rows can be driven and/or stopped at different speeds by these drives and/or braking devices. The web tension of a film tube which is taken up can be influenced through the engagement of individually driven or braking rollers or rolls in a lower region and on the basis of the effectiveness of air blowers in an upper region of the lay-flat device.

An additional configuration of the invention provides for the air blown out through the hollow sections to be temperature-controlled and, hence, cooled or heated. Additional influence can be brought to bear on the film properties in this way.

BRIEF DESCRIPTION OF THE DRAWINGS

An embodiment of the invention is explained in greater detail in the following with the aid of the drawings.

DESCRIPTION OF THE PREFERRED EMBODIMENT

Figure 1:
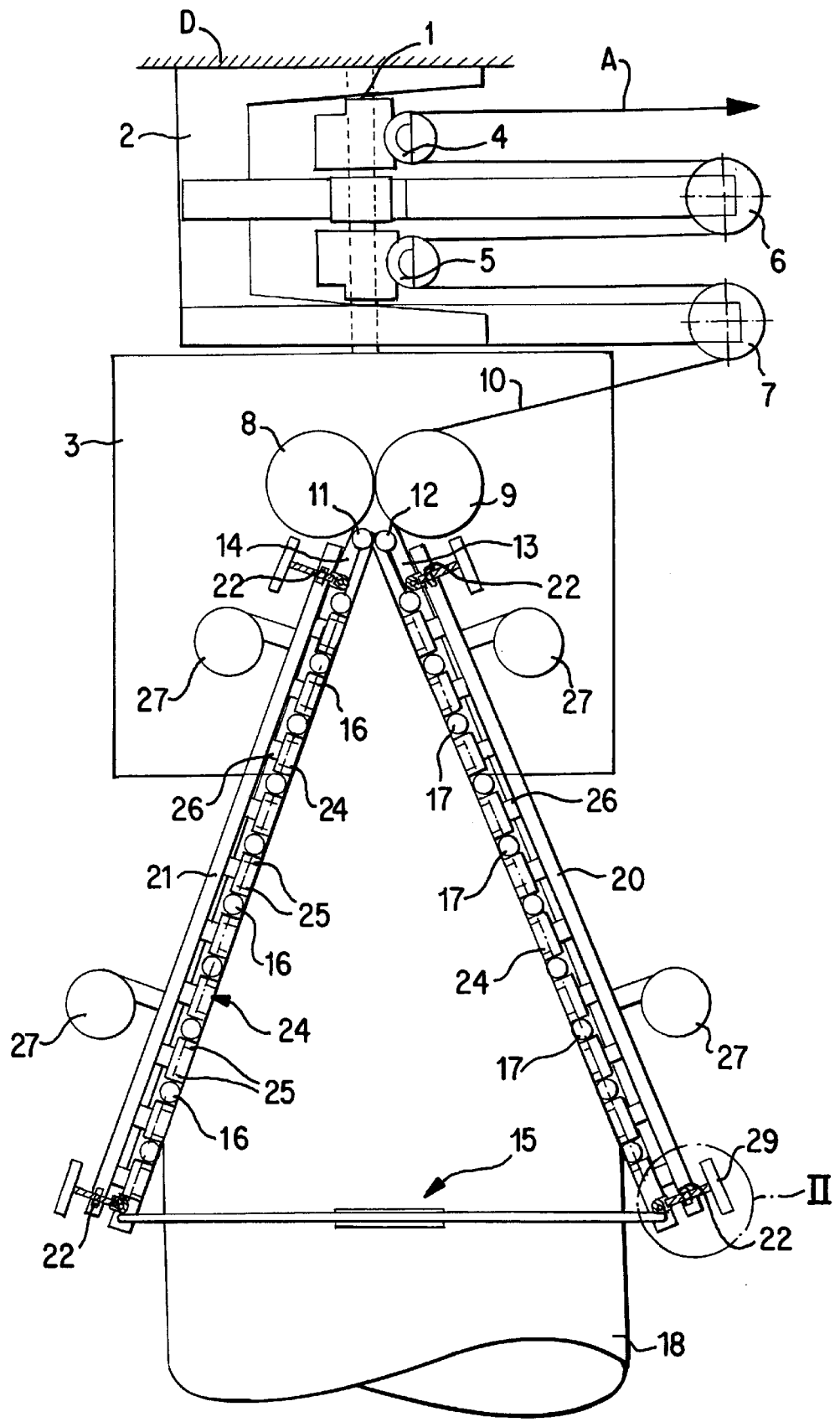
FIG. 1 is a diagrammatic representation of a side view of lay-flat platens with a reversing take-up device.

A supporting frame (2), through which passes a vertical shaft (1), is arranged to hang under a ceiling (D). This shaft carries a frame (3) which is driven to turn about the shaft (1). The shaft is reversible up to 360°, by using a drive which is not represented. Squeeze rollers (8, 9) provided with a conventional drive are supported in the frame (3) and take up the laid-flat film tube (10). The laid-flat film tube (10) is guided, in the manner represented, by turning bars (4, 5) and guide rollers (6, 7). Carriers support the bearing arrangements of these bars and rollers and carry the arrangements so that they are pivotable about the shaft (1). The reversing, taken-up laid-flat film tube travels in the direction of an arrow A to a winding device which is not shown.

In this respect, the device is of a known construction. For a more detailed representation, reference can be made to DE-OS 2,035,584, DE-PS 2,156,079, DE-PS 3,506,772 and DE-OS 4,303,952.

Mountings (13, 14) are pivoted about the shafts of the uppermost rollers (11, 12) between the lateral plates of the frame (3) and closely underneath the squeeze rollers (8, 9). Each of the bottom ends of the mountings (13, 14) is connected to the ends of a spindle pinion (15). These bottom ends, therefore, are pivotable so that the wedge angle of the mountings (13, 14) can be adjusted.

Rows of additional rollers (16, 17) are supported at equal intervals in the mountings (13, 14). The generatrices of these additional rollers facing the film tube (18) which is to be laid flat are located on a common plane.

Figure 2:
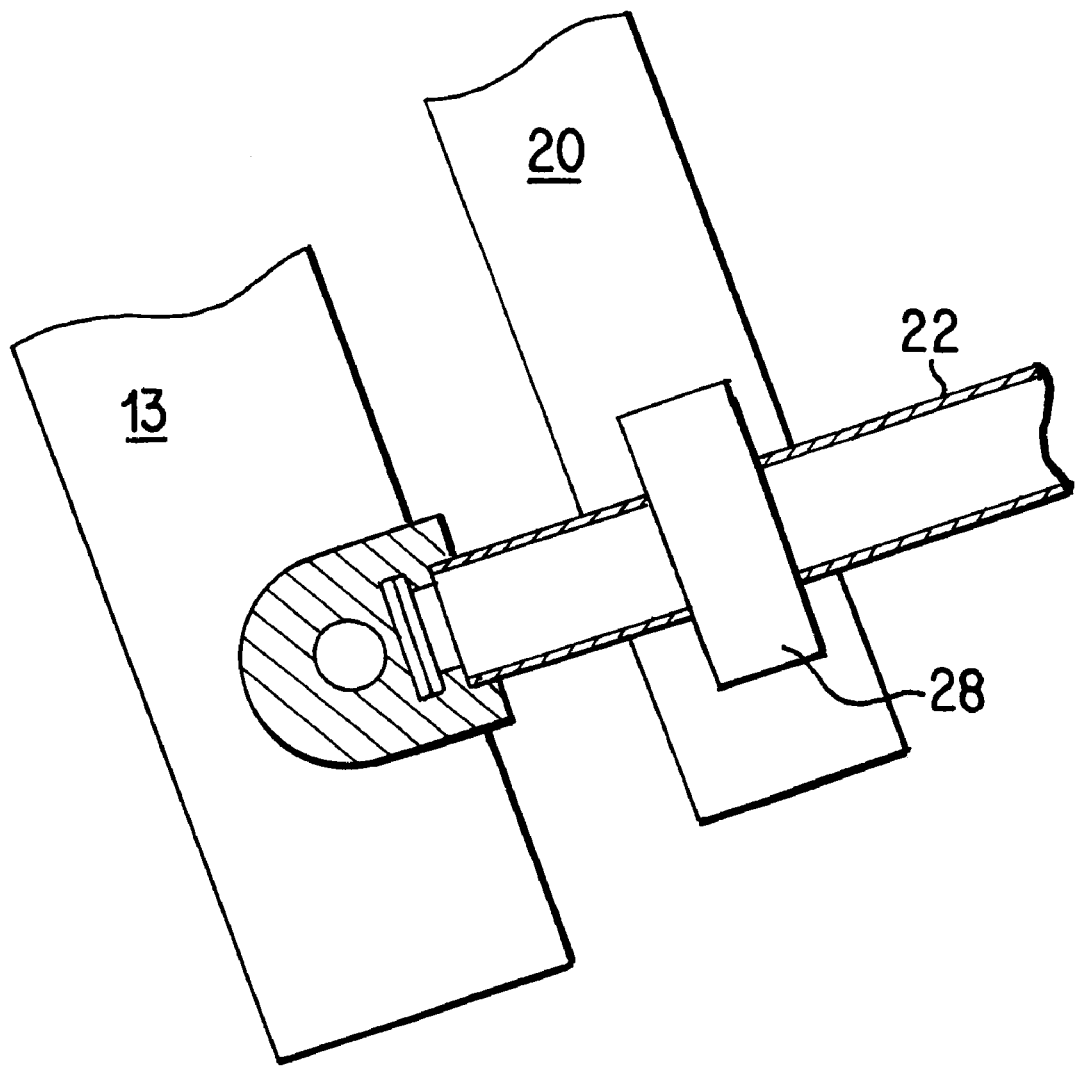
FIG. 2 is an enlarged representation of the regulating device encircled in FIG. 1 by a dashed-dotted line.

Auxiliary mountings (20, 21) are provided. The top and bottom regions of these auxiliary mountings are provided with regulating spindles (22). The auxiliary mountings are provided parallel to the mountings (13, 14). The bottom ends of the regulating spindles (22) are supported in retaining pieces, in the way evident from FIG. 2, such that they can turn but cannot be shifted in an axial direction. The retaining pieces are connected to the mountings (13, 14) such that they are pivotable. The spindle nuts (28) are held fast on the auxiliary mountings (20, 21) so that, by operating the handwheels (29), the positions of the mountings (20, 21) relative to the mountings (13, 14) can be changed. For automatic adjustment, adjusting drives can be provided instead of handwheels.

Hollow sections, shown as box sections (24) in the embodiment represented, are retained on the auxiliary mountings. (20, 21). Each of the walls of the box sections (24) located on the lay-flat plane includes two rows of drilled holes (25) which form air blast nozzles. The box sections (24) are arranged parallel to the additional rollers (16, 17) in the gaps between them. The box sections (24) are connected to connection pieces (26) by which the box sections can be provided with an air blast from blowers (27). The blowers (27), likewise, are arranged on the auxiliary mountings. The air blasts are supplied in a controlled manner and can be completely interrupted.

We claim:

1. A device to lay flat a film tube drawn from an inflated film bubble generated in a film blowing system comprising:

lay-flat platens which delimit the film bubble and which are placed against the film bubble in the form of a wedge, squeeze rollers of a film take-up device, said lay-flat platens being positioned in front of said squeeze rollers, slip elements, with which said lay-flat platens are provided, arranged transversely relative to the take-up device, a driven reversing frame which holds the lay-flat platens and supports the squeeze rollers, and guide rollers and turning bars supported by said driven reversing frame about its rotating axis in pivoting fashion, the slip elements including hollow sections having air blast nozzles or air blast slots which face the film tube to be laid flat and connectable by lines to an air blast source, wherein each lay-flat platen includes a mounting held in the frame, wherein rolls, small rollers or strips in parallel rows and spaced at intervals from each other are arranged in the mounting, wherein the hollow sections are held on an auxiliary mounting connected to the mounting so that they reach between the rolls, small rollers, or strips, and wherein the auxiliary mounting is connected to the mounting by adjustable holding devices, the auxiliary mounting being pivotable relative to, drivable up to and movable away from the mounting by the adjustable holding devices.

2. The device of claim 1, wherein the hollow sections are tubes having rows of air blast nozzles.

3. The device of claim 1, wherein the hollow sections are boxes having at least one row of air blast nozzles.

4. The device of claim 1, wherein the hollow sections are sections provided with slots.

5. The device of claim 1, wherein the lay-flat platens are pivotable about upper shafts of the frame.

6. The device of claim 1, wherein the rolls or small rollers are provided with drives and/or braking devices so that the rolls or small rollers of individual rows can be driven and/or braked at different speeds.

7. The device of claim 2, wherein the lay-flat platens are pivotable about upper shafts of the frame.

8. The device of claim 3, wherein the lay-flat platens are pivotable about upper shafts of the frame.

9. The device of claim 4, wherein the lay-flat platens are pivotable about upper shafts of the frame.

* * * * *